(12) United States Patent
Uesaka et al.

(10) Patent No.: US 10,927,430 B2
(45) Date of Patent: Feb. 23, 2021

(54) MATERIAL FOR LAMINATED IRON CORE, AND METHOD OF MANUFACTURING LAMINATED IRON CORE

(71) Applicant: JFE STEEL CORPORATION, Tokyo (JP)

(72) Inventors: Masanori Uesaka, Tokyo (JP); Kunihiro Senda, Tokyo (JP); Yoshihiko Oda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 241 days.

(21) Appl. No.: 15/538,459

(22) PCT Filed: Oct. 13, 2015

(86) PCT No.: PCT/JP2015/078954
§ 371 (c)(1),
(2) Date: Jun. 21, 2017

(87) PCT Pub. No.: WO2016/103858
PCT Pub. Date: Jun. 30, 2016

(65) Prior Publication Data
US 2017/0342519 A1 Nov. 30, 2017

(30) Foreign Application Priority Data
Dec. 26, 2014 (JP) .............................. JP2014-265754

(51) Int. Cl.
*C21D 8/12* (2006.01)
*C21D 8/02* (2006.01)
(Continued)

(52) U.S. Cl.
CPC .......... *C21D 8/1233* (2013.01); *B32B 15/011* (2013.01); *C21D 8/0236* (2013.01);
(Continued)

(58) Field of Classification Search
None
See application file for complete search history.

(56) References Cited

U.S. PATENT DOCUMENTS 6,340,399 B1  1/2002  Tanaka et al.
6,638,368 B2  10/2003 Tanaka et al.
(Continued)

FOREIGN PATENT DOCUMENTS

CN  1102670 C     3/2003
CN  101026325 A   8/2007
(Continued)

OTHER PUBLICATIONS

Korean Office Action for Korean Application No. 10-2017-7016850, dated Jun. 18, 2018 with Concise Statement of Relevance of Office Action, 4 pages.
(Continued)

*Primary Examiner* — Xiaobei Wang
(74) *Attorney, Agent, or Firm* — RatnerPrestia

(57) ABSTRACT

A material for laminated iron cores is used as plural steel sheets to be overlapped with one another and punched when a laminated iron core is manufactured. A surface roughness of the steel sheets forming the material for laminated iron cores is at an arithmetic mean roughness Ra of 0.40 [μm] or less, and a sheet thickness deviation in a sheet width direction of at least a portion used as the laminated iron core is 3 [μm] or less per 500 [mm], the portion being of the steel sheets forming the material for laminated iron cores.

4 Claims, 6 Drawing Sheets

(51) Int. Cl.
  *C21D 9/46* (2006.01)
  *B32B 15/01* (2006.01)
  *H01F 3/02* (2006.01)
  *H01F 27/245* (2006.01)
  *H02K 15/02* (2006.01)
  *H01F 41/02* (2006.01)

(52) U.S. Cl.
  CPC ............... *C21D 8/12* (2013.01); *C21D 9/46* (2013.01); *H01F 3/02* (2013.01); *H01F 27/245* (2013.01); *H01F 41/0233* (2013.01); *H02K 15/02* (2013.01)

(56) References Cited

U.S. PATENT DOCUMENTS

| | | | |
|---|---|---|---|
| 7,705,509 | B2 | 4/2010 | Harada et al. |
| 2002/0043299 | A1 | 4/2002 | Tanaka et al. |
| 2007/0194652 | A1 | 8/2007 | Harada et al. |
| 2008/0224574 | A1* | 9/2008 | Enomoto ............ H02K 37/18 310/49.01 |
| 2016/0351810 | A1 | 12/2016 | Umehara et al. |

FOREIGN PATENT DOCUMENTS

| | | | |
|---|---|---|---|
| EP | 2778245 | A1 | 9/2014 |
| JP | 54157214 | A | 12/1979 |
| JP | 56103952 | A | 8/1981 |
| JP | 5810445 | B2 | 2/1983 |
| JP | 58108935 | A | 6/1983 |
| JP | H08251845 | A | 9/1996 |
| JP | H11176654 | A | 7/1999 |
| JP | 2000173815 | A | 6/2000 |
| JP | 2001059145 | A | 3/2001 |
| JP | 2003153503 | A | 5/2003 |
| JP | 2003163376 | A | 6/2003 |
| JP | 2003264962 | A | 9/2003 |
| JP | 2003-324870 | * | 11/2003 |
| JP | 2005191033 | A | 7/2005 |
| JP | 2005-348456 | * | 12/2005 |
| JP | 2005332976 | A | 12/2005 |
| JP | 4581228 | B2 | 9/2010 |
| JP | 2011139584 | A | 7/2011 |
| JP | 2011241160 | A | 12/2011 |
| KR | 20010007290 | A | 1/2001 |
| TW | 476791 | B | 2/2002 |
| WO | 2015119039 | A1 | 8/2015 |

OTHER PUBLICATIONS

Chinese Office Action for Chinese Application No. 201580070278.9, dated Feb. 1, 2018 with Concise Statement of Relevance of Office Action, 10 pages.
Japanese Office Action for Japanese Application No. 2014-265754, dated Mar. 6, 2018 with Concise Statement of Relevance of Office Action, 4 pages.
Extended European Search Report for European Application No. 15872427.8, dated Sep. 13, 2017, 8 pages.
International Search Report and Written opinion for International Application No. PCT/JP2015/078954, dated Jan. 12, 2016—10 Pages, 2017.
Taiwan Search Report for Taiwanese Application No. 104137917, dated Feb. 7, 2017, with English language translation—5 Pages, 2017.
Korean Office Action with Concise Statement of Relevance of Office Action for Korean Application No. 10-2017-7016850, dated Apr. 13, 2018, 7 pages.
Notification of Reason for Refusal for Korean Application No. 10-2019-7004672, dated Sep. 9, 2020, with translation, 14 pages.

* cited by examiner

MATERIAL FOR LAMINATED IRON CORE, AND METHOD OF MANUFACTURING LAMINATED IRON CORE

CROSS REFERENCE TO RELATED APPLICATIONS

This is the U.S. National Phase application of PCT/JP2015/078954, filed Oct. 13, 2015, which claims priority to Japanese Patent Application No. 2014-265754, filed Dec. 26, 2014, the disclosures of each of these applications being incorporated herein by reference in their entireties for all purposes.

TECHNICAL FIELD OF THE INVENTION

The present invention relates to a material for a laminated iron core, and a method of manufacturing a laminated iron core.

BACKGROUND OF THE INVENTION

Steel sheets having high magnetic permeability, such as electrical steel sheets, have conventionally been used as a material used in manufacture of laminated iron cores, that is, as a material for laminated iron cores. In general, in manufacture of a laminated iron core, thin steel sheets having high magnetic permeability (for example, electrical steel sheets with thinned down sheet thickness) are fed, as a material for laminated iron cores, into a pressing machine, and are punched into an iron core shape by the pressing machine. Plural iron core shaped steel sheet structures (hereinafter, referred to as punched out bodies), which have been punched out by a pressing machine as described above, are laminated over one another in a sheet thickness direction thereof to be integrated together. As a result, a laminated iron core, such as a motor iron core, is manufactured.

Thinning down the sheet thickness has been demanded for electrical steel sheets, which are a material for laminated iron cores, in order to reduce eddy current loss in a laminated iron core caused upon high speed rotation of the motor or the like. Due to this demand, demand for an electrical steel sheet with a sheet thickness of 0.35 [mm] or less has been increasing.

As described above, further thinning of sheet thickness of electrical steel sheets tends to be demanded for further improvement in efficiency of motors using laminated iron cores. However, further thinning of sheet thickness of electrical steel sheets leads to increase in the number of laminated electrical steel sheets required in manufacture of a laminated iron core. Due to this, time required for punching of electrical steel sheets serving as a material for laminated iron cores is increased, and as a result, a problem of reduction in productivity of laminated iron cores is caused. Further, since stiffness of electrical steel sheets is decreased in association with thinning of sheet thickness of the electrical steel sheets, a problem that warping and bending are caused in punched out bodies of the electrical steel sheets that have been punched by pressing machines is caused.

As a conventional technique for solving these problems, for example, in Patent Literature 1, a method of manufacturing a motor iron core, in which a process of adhering together plural electrical steel sheets by fixing together portions of the plural electrical steel sheets, the portions not being used for the motor iron core, is performed before a process of punching the electrical sheets with a pressing machine, is disclosed. In Patent Literature 2, a method, in which an adhesion layer is formed between plural electrical steel sheets so as not to surround a non-adhesion region, and the plural electrical steel sheets are partially adhered together by the formed adhesion layer, is disclosed.

Further, in Patent Literature 3, a method, in which plural electrical steel sheets are adhered together by an inorganic adhesive being applied to the plural electrical steel sheets, the inorganic adhesive having alumina or silica as a main component thereof, is disclosed. In Patent Literature 4, a method, in which plural electrical steel sheets are adhered together with an adhesion layer formed of an organic resin having a glass transition temperature or a softening temperature of 50 [° C.] or higher, is disclosed.

Further, in Patent Literature 5, a method, in which a multilayer laminated steel sheet is formed by plural electrical steel sheets being laminated together with an adhesive film interposed between the plural electrical steel sheets, and a laminated iron core is manufactured by this multilayer laminated steel sheet being punched by a pressing machine, is disclosed. In Patent Literature 6, a method, in which plural electrical steel sheets are adhered together with a shearing adhesive strength of 50 [Kgf/cm$^2$] or higher, and thereafter, these plural electrical steel sheets are supplied to punching, is disclosed.

PATENT LITERATURE

Patent Literature 1: Japanese Laid-open Patent Publication No. 2003-153503
Patent Literature 2: Japanese Laid-open Patent Publication No. 2003-264962
Patent Literature 3: Japanese Laid-open Patent Publication No. 2005-332976
Patent Literature 4: Japanese Patent No. 4581228
Patent Literature 5: Japanese Laid-open Patent Publication No. 2005-191033
Patent Literature 6: Japanese Laid-open Patent Publication No. 2000-173815

SUMMARY OF THE INVENTION

However, according to the conventional technique described in Patent Literature 1, adhesion of the steel sheet portions punched out in the iron core shape by the pressing machine is not sufficient, and due to this, deviation in the shape of the punched out bodies of the steel sheets serving as the material of laminated iron cores (for example, deviation in circularity thereof) may be caused. Such deviation in the shape of punched out bodies becomes a cause of degradation in the magnetic property of the laminated iron core.

Further, the adhesive strengths between the steel sheets serving as the materials for laminated iron cores may be insufficient according to the conventional techniques described in Patent Literature 2 to Patent Literature 5. In these cases, separation is caused in the adhered portions between the steel sheets, and thus adhesion between the steel sheets becomes insufficient, and deviation in the shapes of the punched out bodies of the steel sheets by the pressing machine is caused. In addition, there is a problem that the separated steel sheets need to be adhered together again, and that this work is troublesome.

According to the conventional technique described in Patent Literature 6, in order to obtain sufficient adhesive strength between the steel sheets serving as a material for laminated iron cores, the thickness of the adhesion layer needs to be made equal to or larger than a predetermined value. As a result, thinning of the adhesion layer between the steel sheets becomes difficult, and thus there is a problem that the space factor of the laminated iron core (the percentage of the steel sheets occupying the layer cross section of the laminated iron core) is decreased. The space factor of a laminated iron core being low causes increase in the energy loss of the laminated iron core.

The present invention has been made in view of the above circumstances, and aims to provide a material for laminated iron cores, and a method of manufacturing a laminated iron core, which enable a satisfactory punched shape to be obtained, and a laminated iron core with a high space factor to be realized.

Inventors of the present invention conducted diligent investigations in order to solve the above described problems. As a result, the inventors found out that the shape of punched out bodies upon punching of overlapped plural steel sheets is improved by reduction in surface roughness and sheet thickness deviation in a sheet width direction of the steel sheets serving as a material for laminated iron cores, and have thus developed the present invention. That is, to solve the above-described problem and achieve the object, a material for laminated iron cores according to the present invention is used as plural steel sheets to be overlapped with one another and punched when a laminated iron core is manufactured, a surface roughness of the steel sheets forming the material for laminated iron cores is at an arithmetic mean roughness Ra of 0.40 [μm] or less, and a sheet thickness deviation in a sheet width direction of at least a portion used as the laminated iron core is 3 [μm] or less per 500 [mm], the portion being of the steel sheets forming the material for laminated iron cores.

Moreover, in the above-described material for laminated iron cores according to an embodiment of the present invention, a value, which is added up of a value resulting from multiplication of the sheet thickness deviation by 0.05, and the surface roughness, is less than 0.5.

Moreover, in the above-described material for laminated iron cores according to an embodiment of the present invention, a sheet thickness of the steel sheets forming the material for laminated iron cores is 0.25 [mm] or less.

Moreover, a method of manufacturing a laminated iron core according to an embodiment of the present invention includes: an overlapping step of overlapping plural steel sheets with one another; a punching step of simultaneously punching the overlapped plural steel sheets, and obtaining punched out bodies from the plural steel sheets; and a laminating and integrating step of laminating and integrating together the punched out bodies and forming the laminated iron core, wherein a surface roughness of the plural steel sheets overlapped with one another in the overlapping step is at an arithmetic mean roughness Ra of 0.40 [μm] or less, and a sheet thickness deviation in a sheet width direction of at least a portion used as the laminated iron core is 3 [μm] or less per 500 [mm], the portion being of the steel sheets.

Moreover, in the above-described method of manufacturing the laminated iron core according to an embodiment of the present invention, a value, which is added up of a value resulting from multiplication of the sheet thickness deviation by 0.05, and the surface roughness, is less than 0.5.

Moreover, in the above-described method of manufacturing the laminated iron core according to an embodiment of the present invention, a sheet thickness of the plural steel sheets overlapped with one another in the overlapping step is 0.25 [mm] or less.

Moreover, in the above-described method of manufacturing the laminated iron core according to an embodiment of the present invention further includes a pressing step of pressing the overlapped plural steel sheets in a sheet thickness direction thereof, and removing air that is present between overlapped surfaces of the plural steel sheets, and in the punching step, the plural steel sheets, in which the air has been removed from between the overlapped surfaces, are simultaneously punched.

Moreover, in the above-described method of manufacturing the laminated iron core according to an embodiment of the present invention further includes an application step of applying an oil based agent on the overlapped plural steel sheets, and in the pressing step, the plural steel sheets that have been applied with the oil based agent are pressed in the sheet thickness direction.

Moreover, in the above-described method of manufacturing the laminated iron core according to an embodiment of the present invention further includes a cold rolling surface treatment step of performing cold rolling and surface treatment on the steel sheets before the overlapping, and adjusting the surface roughness to an arithmetic mean roughness Ra of 0.40 [μm] or less and adjusting the sheet thickness deviation to 3 [μm] or less per 500 [mm], and in the overlapping step, the plural steel sheets having the surface roughness and the sheet thickness deviation that have been adjusted in the cold rolling surface treatment step are overlapped with one another.

According to the present invention, an effect of being able to obtain a satisfactory punched out shape and to realize a laminated iron core with a high space factor is achieved.

DETAILED DESCRIPTION OF EMBODIMENTS OF THE INVENTION

Hereinafter, by reference to the appended drawings, a preferred embodiment of a material for laminated iron cores, and a method of manufacturing a laminated iron core, according to the present invention, will be described in detail. The present invention is not limited by this embodiment. Further, the drawings are schematic, and it needs to be noted that relations among dimensions of respective elements, ratios among the respective elements, and the like, may be different from the actual ones. A portion may be included, which has different dimensional relations and ratios among the drawings. Further, in each of the drawings, the same components are appended with the same reference signs.

(Configuration of Laminated Iron Core Manufacturing Apparatus)

Figure 1:
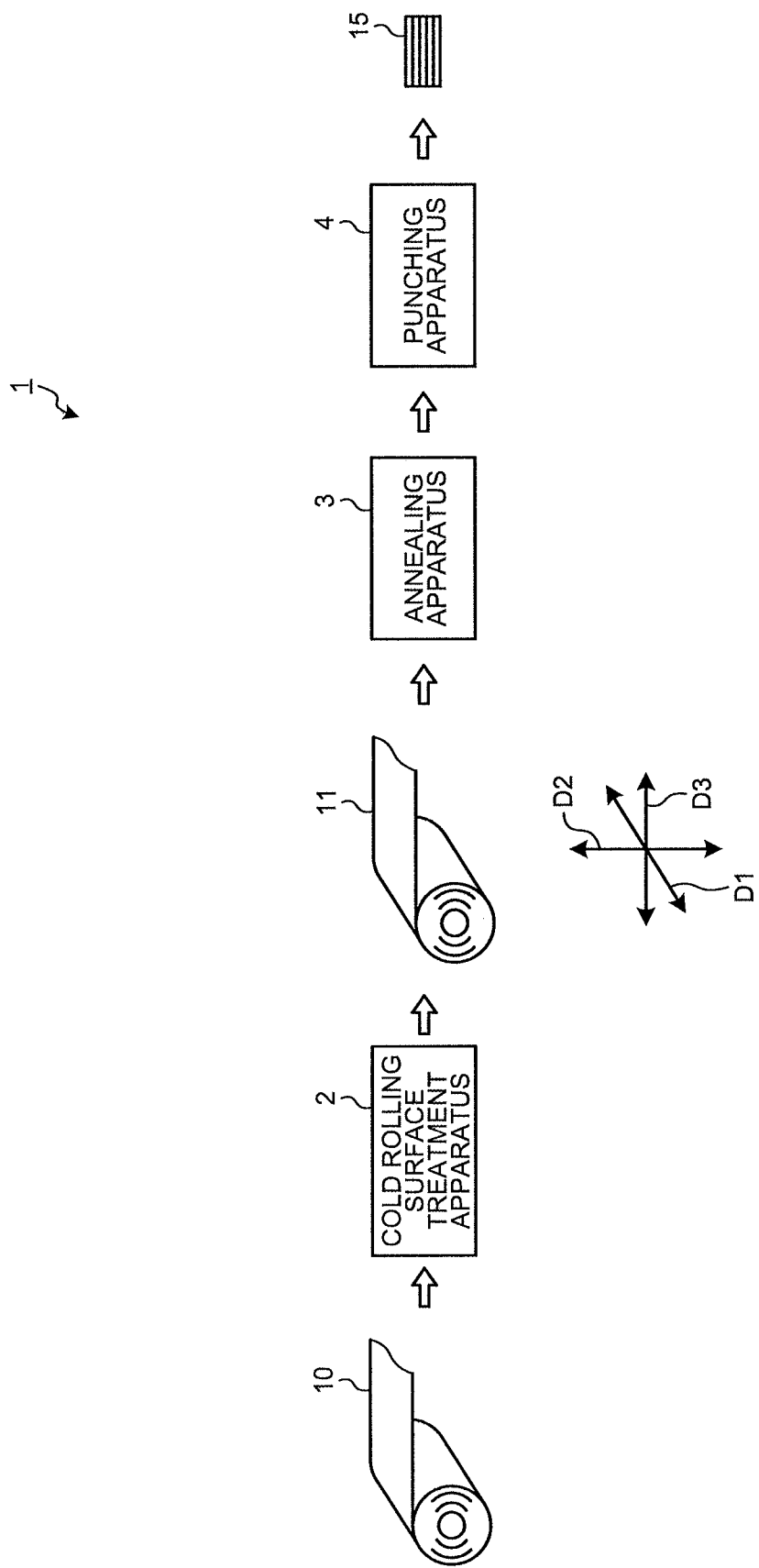
FIG. 1 is a diagram illustrating an example of a configuration of a laminated iron core manufacturing apparatus according to an embodiment of the present invention.

First of all, a configuration of a laminated iron core manufacturing apparatus that manufactures a laminated iron core by using a material for laminated iron cores, according to an embodiment of the present invention, will be described. FIG. 1 is a diagram illustrating an example of the configuration of the laminated iron core manufacturing apparatus according to the embodiment of the present invention. In this embodiment, a laminated iron core manufacturing apparatus 1 manufactures a laminated iron core 15 by using a steel sheet 11 serving as a material for laminated iron cores, and forms a part of a laminated iron core manufacturing line. This laminated iron core manufacturing apparatus 1 includes, as illustrated in FIG. 1, a cold rolling surface treatment apparatus 2, an annealing apparatus 3, and a punching apparatus 4. In FIG. 1, thick lined arrows each illustrate a flow of conveyance of a steel sheet 10, the steel sheet 11, or the laminated iron core 15.

The cold rolling surface treatment apparatus 2 forms the material for laminated iron cores by cold rolling and surface treatment. As illustrated in FIG. 1, the cold rolling surface treatment apparatus 2 sequentially receives the steel sheet 10 that is in a state of having been wounded in a coil shape, and performs cold rolling and surface treatment on the received steel sheet 10 to adjust sheet thickness, surface roughness, and sheet thickness deviation in a sheet width direction D1, of this steel sheet 10. In the adjustment, the cold rolling surface treatment apparatus 2, for example, reduces the sheet thickness of the steel sheet 10 to 0.25 [mm] or less, reduces the surface roughness of the steel sheet 10 to an arithmetic mean roughness Ra of 0.40 [μm] or less, and reduces the sheet thickness deviation in the sheet width direction D1 of the steel sheet 10 to about 3 [μm] or less per 500 [mm]. Accordingly, the cold rolling surface treatment apparatus 2 processes the steel sheet 10 serving as a material into the steel sheet 11 serving as the material for laminated iron cores. Thereafter, the cold rolling surface treatment apparatus 2 winds the steel sheet 11 obtained as the material for laminated iron cores into a coil shape. The steel sheet 11 is, as illustrated in FIG. 1, sequentially conveyed from the cold rolling surface treatment apparatus 2 to the annealing apparatus 3, in the state of having been wound in the coil shape.

The steel sheet 10 is a material that is used for manufacture of the steel sheet 11 serving as the material for laminated iron cores. This steel sheet 10 is manufactured by: a slab being hot rolled after being heated, the slab having a predetermined metallic composition; and necessary processes, such as an annealing process and a pickling process, being performed on the obtained hot rolled steel sheet.

The annealing apparatus 3 performs a final annealing process on the material for laminated iron cores, that is, the steel sheet 11, which has been manufactured by the cold rolling surface treatment apparatus 2. As illustrated in FIG. 1, the annealing apparatus 3 is installed downstream from the above described cold rolling surface treatment apparatus 2. The annealing apparatus 3 continuously performs final annealing on the steel sheet 11 from the cold rolling surface treatment apparatus 2, and winds the steel sheet 11 after the final annealing into a coil shape. The steel sheet 11 after the final annealing is sequentially conveyed to the punching apparatus 4 from the annealing apparatus 3, in the state of having been wound in the coil shape. In this embodiment, the steel sheet 11 after the final annealing is an electrical steel sheet (non-oriented electrical steel sheet or the like) having high magnetic permeability.

The punching apparatus 4 is for forming a laminated iron core by using the material for laminated iron cores, according to the embodiment of the present invention. As illustrated in FIG. 1, the punching apparatus 4 is installed downstream from the annealing apparatus 3. The punching apparatus 4 receives plural steel sheets 11 that have been subjected to the final annealing by the annealing apparatus 3 as a material for laminated iron cores, and overlaps the received plural steel sheets 11 with one another in their sheet thickness direction D2. Thereafter, the punching apparatus 4 simultaneously punches these overlapped plural steel sheets 11 into a targeted iron core shape. Thereby, the punching apparatus 4 obtains plural punched out bodies (illustration thereof being omitted) that have the targeted iron core shape and overlap with one another, from those plural steel sheets 11. The punching apparatus 4 laminates the plural iron core shaped punched out bodies that have been obtained as described above onto one another in their sheet thickness direction D2, and integrates them together. Thereby, the punching apparatus 4 forms (manufactures) the targeted laminated iron core 15.

Figure 2:
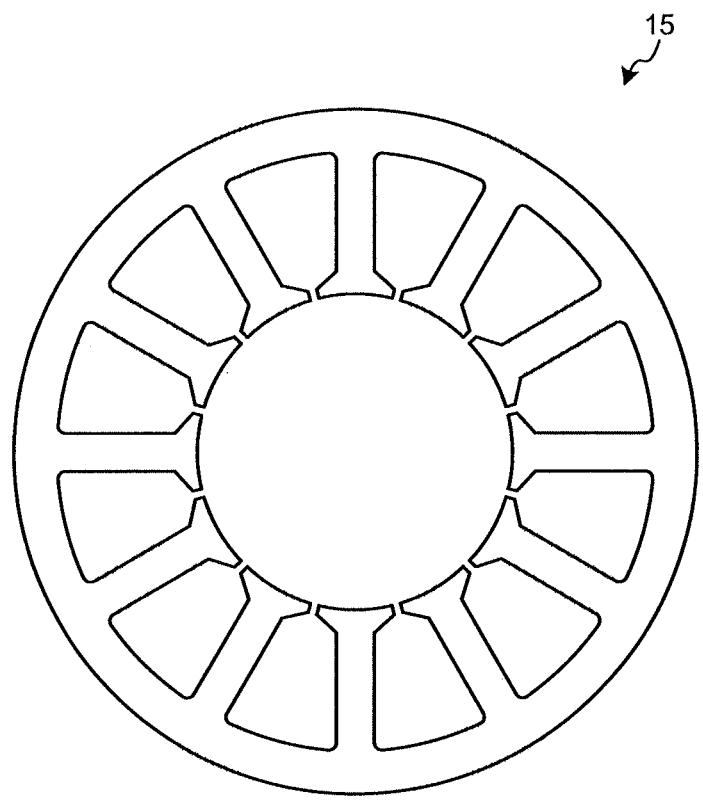
FIG. 2 is a diagram illustrating an example of a laminated iron core manufactured by use of a material for laminated iron cores, according to the embodiment of the present invention.

FIG. 2 is a diagram illustrating an example of a laminated iron core manufactured by use of the material for laminated iron cores, according to the embodiment of the present invention. The laminating direction of the laminated iron core 15 illustrated in FIG. 2 is a direction perpendicular to the plane of paper of FIG. 2, and is the same as the thickness direction of the punched out bodies of the steel sheets 11, the punched out bodies forming this laminated iron core 15. In this embodiment, in order to manufacture the laminated iron core 15, which is, for example, ring shaped as illustrated in FIG. 2, the punching apparatus 4 simultaneously punches the plural overlapping steel sheets 11 into an iron core shape (ring shape) corresponding to this laminated iron core 15. Thereby, the punching apparatus 4 obtains plural punched out bodies having a ring shape that is the same as the laminated iron core 15 illustrated in FIG. 2. The punching apparatus 4 is able to manufacture the laminated iron core 15, which is ring shaped as illustrated in FIG. 2, by laminating, for plurality of times, these plural punched out bodies in their sheet thickness direction D2 onto one another and integrating them together.

In this embodiment, the sheet width direction D1 is a direction of the sheet width of the steel sheet 11 serving as the material for laminated iron cores. The sheet thickness direction D2 is a direction of the sheet thickness of this steel sheet 11. A longitudinal direction D3 is a longitudinal direction (rolling direction) of this steel sheet 11. These sheet width direction D1, sheet thickness direction D2, and longitudinal direction D3 are, as illustrated in FIG. 1, perpendicular to one another. Further, these sheet width direction D1, sheet thickness direction D2, and longitudinal direction D3 are the same for the steel sheet 10 serving as a material.

(Material for Laminated Iron Cores)

Next, the material for laminated iron cores, according to the embodiment of the present invention will be described. The material for laminated iron cores according to the embodiment of the present invention is a high magnetic permeability material, such as electrical steel sheets, which are used as plural steel sheets to be overlapped with one another and punched when a laminated iron core is manufactured. In this embodiment, the steel sheet 11 serving as the material for laminated iron cores is manufactured by adjustment of the sheet thickness, surface roughness, and sheet thickness deviation in the sheet width direction D1 of the steel sheet 10 serving as a material, through cold rolling and surface treatment, as described above. That is, the steel sheet 11 has the same composition as the steel sheet 10 before the cold rolling (for example, the composition as the electrical steel sheet), and is a thin steel sheet having the surface roughness and the sheet thickness deviation in the sheet width direction D1 that have been reduced, as compared to those of the steel sheet 10.

The surface roughness of the above described steel sheet 11 forming the material for laminated iron cores is at an arithmetic mean roughness Ra of 0.40 [μm] or less, and the sheet thickness of the steel sheet 11 is 0.25 [mm] or less. Further, the sheet thickness deviation in the sheet width direction D1 of at least a portion that is used as the laminated iron core 15 of the above described steel sheet 11 forming the material for laminated iron cores (that is, the portion that is punched out into the iron core shape) is 3 [μm] or less per 500 [mm].

The surface roughness of the steel sheet 11 influences the process, in which the plural steel sheets 11 are overlapped with one another and simultaneously punched by the punching apparatus 4. Specifically, if the surface roughness of the steel sheets 11 is too large, a gap allowing air to easily enter the gap is generated between the overlapped surfaces of the plural steel sheets 11 that have been overlapped with each other to be punched into the iron core shape. Due to this entrance of air into the gap between the overlapped surfaces, bending is caused in these plural steel sheets 11, and as a result, variation in the shape of the punched out bodies of these plural steel sheets 11 is caused. Further, even if the overlapped plural steel sheets 11 are adhered to each other by an adhesive or by welding, in this state where the air has entered the gap between the overlapped surfaces of these plural steel sheets 11, relative displacement between vertically overlapping steel sheets 11 in the sheet thickness direction D2 is caused. Due to this, these punched out bodies of the plural steel sheets 11 will be laminated onto one another in a state of being deformed from the targeted iron core shape, or a state of having stress.

Against this, by reduction of the surface roughness of the steel sheets 11 to an arithmetic mean roughness Ra of 0.40 [μm] or less, the above described gap between the overlapped surfaces of the plural steel sheets 11 is reduced, and thus, it will be difficult for air to enter this gap. As a result, since bending and displacement of the overlapped plural steel sheets 11 will be reduced, these plural steel sheets 11 will be able to be punched into the targeted iron core shape accurately. Therefore, the surface roughness of the steel sheets 11 to be plurally overlapped and punched in order for the punched out bodies having the targeted iron core shape to be obtained needs to be at an arithmetic mean roughness Ra of 0.40 [μm] or less. Further, in order to improve the punched out shape of these plural steel sheets 11 (that is, the shape of the punched out bodies from the steel sheets 11) further, the surface roughness of the steel sheets 11 is preferably made 0.30 [μm] or less.

Similarly to the above described surface roughness, the sheet thickness deviation in the sheet width direction D1 of the steel sheet 11 is a factor influencing the process, in which the plural steel sheets 11 are overlapped with one another and simultaneously punched. Specifically, if the sheet thickness deviation in the sheet width direction D1 of the steel sheet 11 is too large, it becomes easy for air to enter a gap between the overlapped surfaces of the plural steel sheets 11 that have been overlapped with each other to be punched into the iron core shape. Since bending is caused in these plural steel sheets 11 due to this, the punched out shapes of these plural steel sheets 11 (that is, shapes of the plural punched out bodies) vary.

Against this, by reduction of the sheet thickness deviation in the sheet width direction D1 of the steel sheet 11 to 3 [μm] or less per 500 [mm], the above described gap between the overlapped surfaces of the plural steel sheets 11 is reduced, and thus entrance of air into this gap is reduced. As a result, since bending and displacement of the overlapped plural steel sheets 11 are reduced, variation in the punched out shapes of these plural steel sheets 11 (for example, variation from the targeted iron core shape) is able to be reduced. Therefore, the sheet thickness deviation in the sheet width direction D1 of each the steel sheets 11 to be plurally overlapped with one another and punched in order for the punched out bodies having the targeted iron core shape to be obtained needs to be made 3 [μm] or less per 500 [mm]. Further, in order to improve the punched out shape of these plural steel sheets 11 further, the sheet thickness deviation in the sheet width direction D1 of each of the steel sheets 11 is preferably made 1 [μm] or less per 500 [mm].

Further, when a condition where a value is less than "0.5" is satisfied, the value being added up of: a value resulting from multiplication of the above described sheet thickness deviation in the sheet width direction D1 of the steel sheets 11 by "0.05"; and the surface roughness of the steel sheets 11, an effect that the punched out shape of the overlapped plural steel sheets 11 is further improved is obtained. This is because due to a synergistic effect of the effect due to the reduction in surface roughness of the steel sheets 11 and the reduction in sheet thickness deviation in the sheet width direction D1, which have been described above, the gap between the overlapped surfaces of the plural steel sheets 11 is reduced further, and thereby entrance of air into this gap is able to be reduced even further.

In this embodiment, the surface roughness of the steel sheet 11 is at an arithmetic mean roughness Ra of 0.40 [μm] or less, and the sheet thickness deviation x in the sheet width direction D1 of the steel sheet 11 is 3 [μm] or less per 500 [mm]. In this case, in order to achieve an effect of further improvement of the above described punched out shape of the steel sheets 11, the surface roughness Ra of the steel sheets 11 (that is, the surface roughness in terms of arithmetic mean roughness Ra) and the sheet thickness deviation x desirably satisfy the following Equation (1).

$$0.5 > Ra + 0.05 \times x \qquad (1)$$

In a high speed rotation zone of a motor using the laminated iron core 15, increase in eddy current loss generated in the laminated iron core 15 influences energy loss in the entire laminated iron core 15. In order to increase efficiency of such a motor, increase in eddy current loss in the laminated iron core 15 needs to be reduced. This energy loss due to the increase in the eddy current loss in the laminated iron core 15 is able to be reduced by the sheet thickness of the steel sheet 11 forming the material for laminated iron cores being made 0.25 [mm] or less. This is because, by thinning the sheet thickness of each of the steel sheets 11 to 0.25 [mm] or less, energy loss due to eddy current inside the punched out bodies of the steel sheets 11 forming the laminated iron core 15 is able to be reduced. Further, in order to reduce the above described energy loss even more in the laminated iron core 15, the sheet thickness of the steel sheet 11 is desirably made 0.20 [mm] or less.

(Configuration of Cold Rolling Surface Treatment Apparatus)

Figure 3:
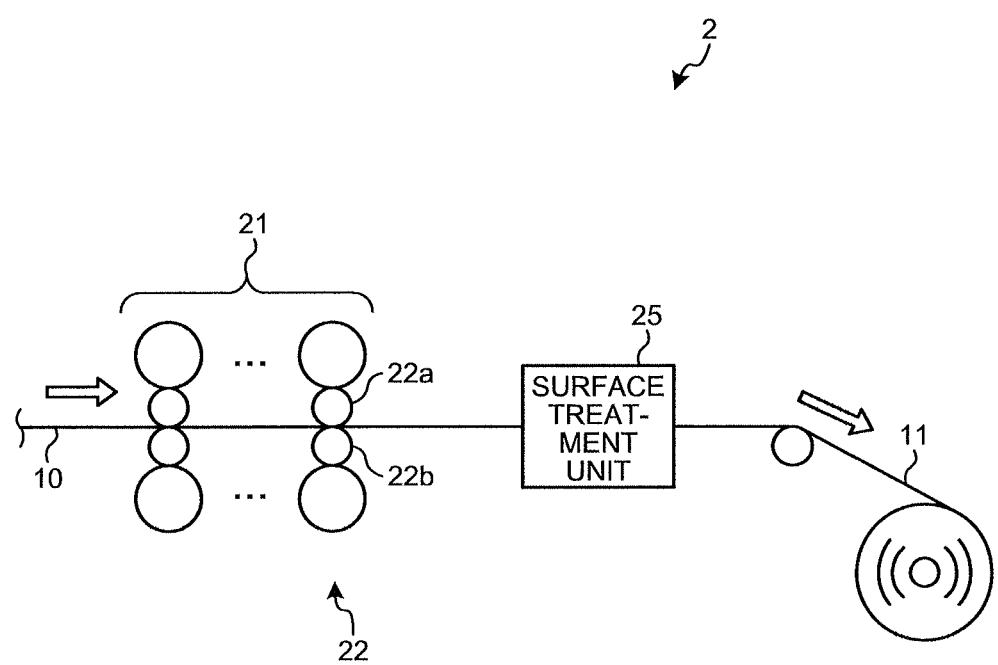
FIG. 3 is a diagram illustrating an example of a configuration of main parts of a cold rolling surface treatment apparatus, according to the embodiment of the present invention.

Next, a configuration of the cold rolling surface treatment apparatus 2 according to the embodiment of the present invention will be described. FIG. 3 is a diagram illustrating an example of a configuration of main parts of the cold rolling surface treatment apparatus, according to the embodiment of the present invention. The cold rolling surface treatment apparatus 2 according to the embodiment of the present invention forms the material for laminated iron cores by cold rolling and surface treatment of the steel sheets 10 serving as a material, and as illustrated in FIG. 3, includes a tandem cold rolling mill 21 and a surface treatment unit 25.

The tandem cold rolling mill 21 continuously performs cold rolling of the steel sheet 10 sequentially passed therethrough, and is formed of plural rolling mills arranged in parallel along a sheet passing direction (see thick lined arrows in FIG. 3) of the steel sheet 10. Each of the plural rolling mills forming the tandem cold rolling mill 21 includes a pair of rolling mill rolls, between which the steel sheet 10 is to be interposed, and sequentially performs cold rolling of the steel sheet 10 by action of the pair of rolling mill rolls or the like. The tandem cold rolling mill 21 having such a configuration causes the steel sheet 10 to travel from an entrance side end thereof towards an exit side end, and sequentially performs cold rolling of this steel sheet 10 with the plural rolling mills. Thereby, the tandem cold rolling mill 21 makes the sheet thickness of the steel sheet 10 to 0.25 [mm] or less. The tandem cold rolling mill 21 sequentially sends out the steel sheet 10 with the sheet thickness having been cold rolled to 0.25 [mm] or less as described above towards the surface treatment unit 25.

The surface treatment unit 25 performs surface treatment, in which the surface roughness and the sheet thickness deviation in the sheet width direction D1 (see FIG. 1) of the steel sheet 10 that has been cold rolled are adjusted. As illustrated in FIG. 3, the surface treatment unit 25 is arranged downstream from the tandem cold rolling mill 21, that is, downstream in the sheet passing direction of the steel sheet 10 from the tandem cold rolling mill 21. By performing predetermined surface treatment on the steel sheet 10 that has been cold rolled, the surface treatment unit 25 adjusts the surface roughness of this steel sheet 10 to an arithmetic mean roughness Ra of 0.40 [µm] or less, and adjusts the sheet thickness deviation in the sheet width direction D1 of the steel sheet 10 to 3 [µm] or less per 500 [mm]. As a result, the steel sheet 10 serving as a material is processed into a thin steel sheet with a sheet thickness of 0.25 [mm] or less, the thin steel sheet having a surface roughness at an arithmetic mean roughness Ra of 0.40 [µm] or less and a sheet thickness deviation in the sheet width direction D1 of 3 [µm] or less per 500 [mm], that is, the steel sheet 11 serving as the material for laminated iron cores. The steel sheet 11 formed by the respective actions of the tandem cold rolling mill 21 and the surface treatment unit 25 as described above is wound into a coil shape, after being sent out from the surface treatment unit 25, as illustrated in FIG. 3.

The surface treatment on the steel sheet 10 by the surface treatment unit 25 may be light reduction of the steel sheet 10 with rolls with smooth surfaces, physical grinding of the surface of the steel sheet 10, or chemical polishing of the surface of the steel sheet 10 by use of an acidic medium.

That is, the surface treatment unit 25 may include a necessary number of reducing rolls that have been polished beforehand such that the roughness of the roll surfaces is at an arithmetic mean roughness Ra of 0.4 [µm] or less, and by light reduction of the surface of the steel sheet 10 with such reducing rolls, the surface roughness and the sheet thickness deviation in the sheet width direction D1 of the steel sheet 10 may be adjusted to values in the above described ranges. Further, the surface treatment unit 25 may include a fine grained grinding means, such as a grinder or grinding rolls, and by physical grinding of the surface of the steel sheet 10 with this grinding means, the surface roughness and the sheet thickness deviation in the sheet width direction D1 of the steel sheet 10 may be adjusted to values in the above described ranges. Or, the surface treatment unit 25 may include a container containing therein an acidic medium (for example, an acidic aqueous solution), and conveyance rolls for taking the steel sheet 10 into and out from the acidic medium in this container, and by dipping the steel sheet 10 into the acidic medium in the container with the conveyance rolls and chemically polishing the surface of the steel sheet 10 with this acidic medium, the surface roughness and the sheet thickness deviation in the sheet width direction D1 of the steel sheet 10 may be adjusted to values in the above described ranges.

A most downstream rolling mill 22 that is positioned at the most downstream stage of the plural rolling mills forming the tandem cold rolling mill 21 illustrated in FIG. 3 may include a pair of rolling mill rolls 22a and 22b, which have been polished beforehand such that roughness of the roll surfaces is at an arithmetic mean roughness Ra of 0.4 [µm] or less. That is, the most downstream rolling mill 22 may perform cold rolling by use of these pair of rolling mill rolls 22a and 22b with the steel sheet 10 interposed therebetween, and surface treatment, by which the surface of the steel sheet 10 is smoothed down, to thereby adjust the sheet thickness, the surface roughness, and the sheet thickness deviation in the sheet width direction D1 of the steel sheet 10 to values in the above described ranges. In this case, the cold rolling surface treatment apparatus 2 may be without the above described surface treatment unit 25.

(Configuration of Punching Apparatus)

Figure 4:
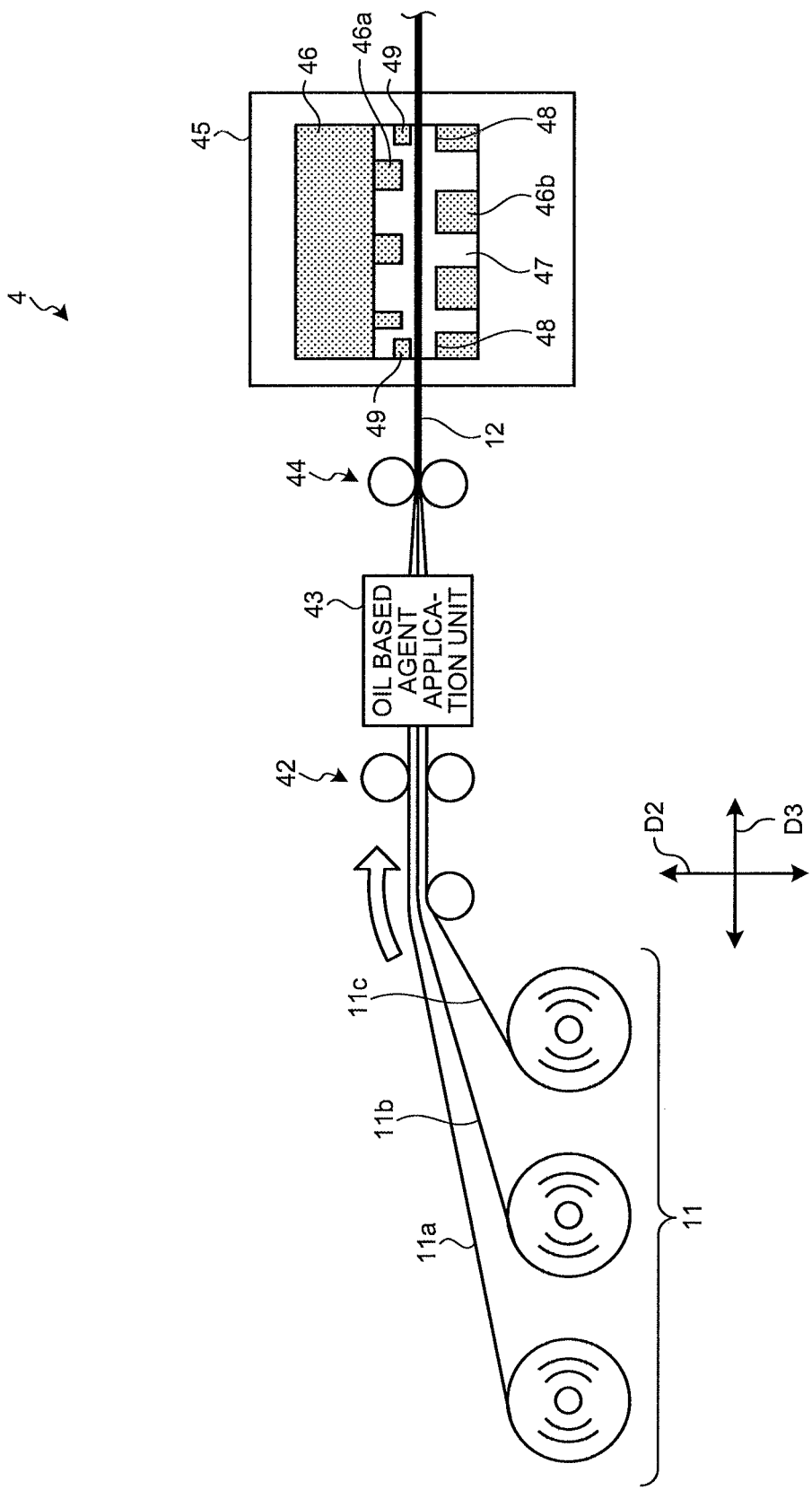
FIG. 4 is a diagram illustrating an example of a configuration of main parts of a punching apparatus, according to the embodiment of the present invention.

Next, a configuration of the punching apparatus 4 according to the embodiment of the present invention will be described. FIG. 4 is a diagram illustrating an example of a configuration of main parts of the punching apparatus according to the embodiment of the present invention. The punching apparatus 4 according to the embodiment of the present invention forms a laminated iron core (for example, the laminated iron core 15 having the ring shape illustrated in FIG. 2) by performing punching or the like on the steel sheets 11 serving as the material for laminated iron cores. As illustrated in FIG. 4, the punching apparatus 4 includes pinch rolls 42, an oil based agent application unit 43, a pressing unit 44, and a pressing machine 45.

The pinch rolls 42 have a function as an overlapping means that overlaps a plurality of the steel sheets 11 serving as the material for laminated iron cores in the sheet thickness direction D2 thereof. Specifically, as illustrated in FIG. 4, the pinch rolls 42 are formed by use of a pair of rotating rolls, and are arranged downstream from a put out position of plural steel sheets 11 (for example, three steel sheets 11a, 11b, and 11c) supplied to the punching apparatus 4 as the material for laminated iron cores. In this embodiment, as illustrated in FIG. 4, while causing the steel sheets 11a, 11b, and 11c put out from the respective steel sheet coils as the material for laminated iron cores to travel in their sheet passing direction (see a thick lined arrow in FIG. 4), the pinch rolls 42 overlap these steel sheets 11a, 11b, and 11c with one another in the sheet thickness direction D2.

The oil based agent application unit 43 applies an oil based agent onto the plural steel sheets 11 overlapping one another. Specifically, as illustrated in FIG. 4, the oil based agent application unit 43 is arranged downstream from the pinch rolls 42. In this embodiment, the oil based agent application unit 43 applies an oil based agent, such as rolling oil, onto the steel sheets 11a, 11b, and 11c that have been overlapped with one another by the pinch rolls 42. The steel sheets 11a, 11b, and 11c that have been applied with the oil based agent are passed to the pressing unit 44 from the oil based agent application unit 43 with the overlapped state being maintained.

The pressing unit 44 performs pressing, in which the overlapped plural steel sheets 11 are pressed in their sheet thickness direction D2, and air that is present between the overlapped surfaces of these plural steel sheets 11 is removed. Specifically, as illustrated in FIG. 4, the pressing unit 44 is formed by use of a pair of rubber made rolls, and is arranged downstream from the oil based agent application unit 43. In this embodiment, while maintaining the overlapped state of the steel sheets 11a, 11b, and 11c that have been applied with the oil based agent by the oil based agent application unit 43 and causing them to travel in the longitudinal direction D3, the pressing unit 44 sandwiches and presses the steel sheets 11a, 11b, and 11c therebetween. Thereby, the pressing unit 44 removes air from between the overlapped surfaces of these steel sheets 11a, 11b, and 11c, and adheres the steel sheets 11a, 11b, and 11c to one another in the sheet thickness direction D2. The pressing unit 44 sequentially sends an adhered body 12, which is the steel sheets 11a, 11b, and 11c that have been adhered to one another, toward the pressing machine 45.

The pressing machine 45 forms the laminated iron core 15 by performing punching, by which the plural steel sheets 11 that have been overlapped with one another as the material for laminated iron cores are simultaneously punched. Specifically, as illustrated in FIG. 4, the pressing machine 45 includes a die of press forming 46 for punching, and is arranged downstream from the pressing unit 44. The die of press forming 46 includes a punch 46a and a die 46b. Provided in the die 46b are: a die hole 47 that is a through hole having a shape corresponding to the targeted iron core shape; and a die plate 48 that contacts the plural steel sheets 11 (the adhered body 12 of the steel sheets 11a, 11b, and 11c in FIG. 4) serving as the material for laminated iron cores. The punch 46a is configured to be able to rise and fall relatively to the die 46b by a control device (not illustrated) of the pressing machine 45. Further, the die of press forming 46 includes a blank holder 49. The blank holder 49 holds a portion around an end portion of the plural steel sheets 11 serving as the material for laminated iron cores from the punch 46a side upon the above described punching, and thereby presses and binds these plural steel sheets 11 against the die plate 48.

In this embodiment, when the punch 46a provided at a position corresponding to the die hole 47 is inserted into the die hole 47, the material for laminated iron cores (specifically, the adhered body 12 of the steel sheets 11a, 11b, and 11c) sandwiched in the die of press forming 46 is sheared according to the shape of the die hole 47. Thereby, the steel sheets 11a, 11b, and 11c forming this adhered body 12 are simultaneously punched into the targeted iron core shape. As a result, the pressing machine 45 obtains plural iron core shaped punched out bodies, which have been punched out from these steel sheets 11a, 11b, and 11c. The pressing machine 45 forms the laminated iron core 15 by laminating and integrating together, inside the die of press forming 46, the plural punched out bodies obtained by such punching.

(Method of Manufacturing Laminated Iron Core)

Figure 5:
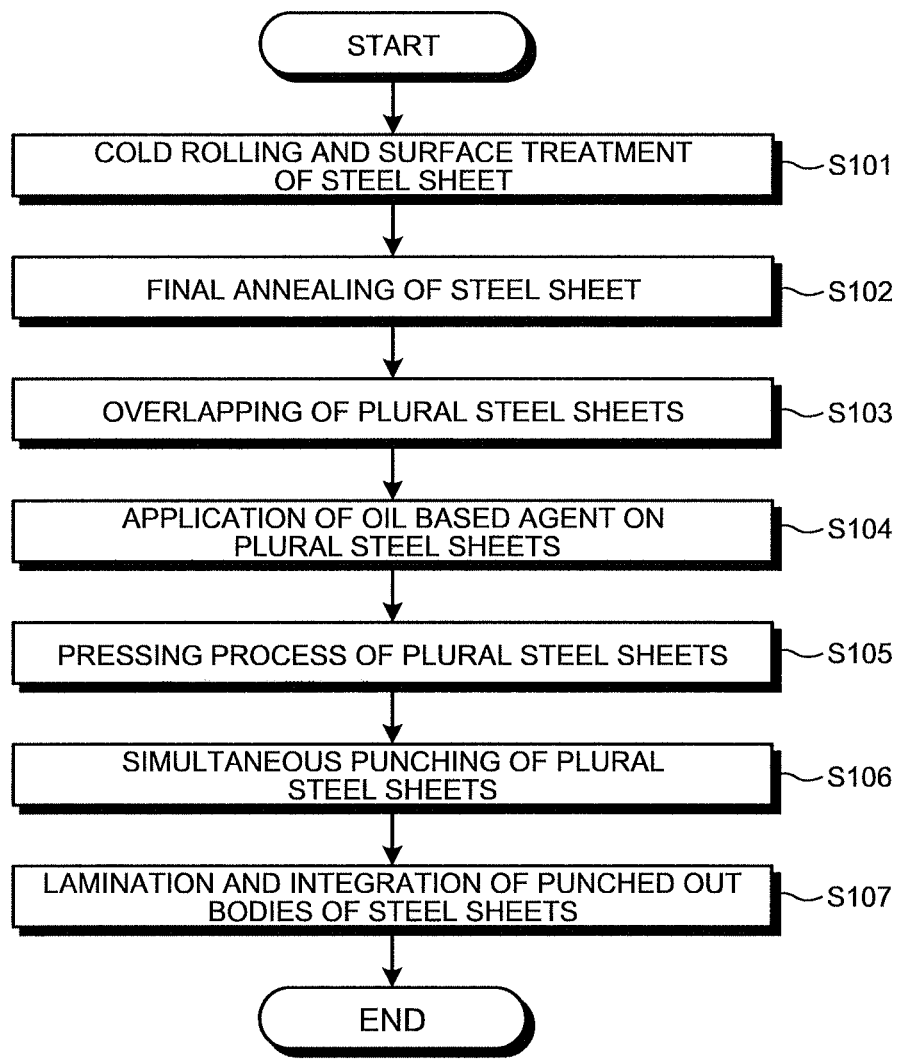
FIG. 5 is a flow chart illustrating an example of a method of manufacturing a laminated iron core, according to the embodiment of the present invention.

Next, a method of manufacturing a laminated iron core, according to the embodiment of the present invention will be described. FIG. 5 is a flow chart illustrating an example of the method of manufacturing a laminated iron core, according to the embodiment of the present invention. In the method of manufacturing a laminated iron core, according to the embodiment of the present invention, the laminated iron core 15 is, as described above, manufactured by: the steel sheets 10 prepared by the process, such as hot rolling, being processed into the steel sheets 11 serving as the material for laminated iron cores; and punching or the like being performed on the obtained steel sheets 11, through sequential execution of processing of Steps S101 to S107 illustrated in FIG. 5.

That is, in the method of manufacturing a laminated iron core, according to the embodiment of the present invention, as illustrated in FIG. 5, the laminated iron core manufacturing apparatus 1 manufactures the steel sheets 11 serving as a material for laminated iron cores, by performing cold rolling and surface treatment on steel sheets prior to overlapping by later described Step S103, that is, the steel sheets 10 that have been prepared beforehand as a material, as described above (Step S101).

At Step S101, the tandem cold rolling mill 21 in the cold rolling surface treatment apparatus 2 of the laminated iron core manufacturing apparatus 1 continuously performs cold rolling of the steel sheet 10 serving as a material while causing the steel sheet 10 to travel in the longitudinal direction D3. Thereby, the tandem cold rolling mill 21 makes the sheet thickness of the steel sheet 10 to 0.25 [mm] or less. The steel sheet 10 that has been cold rolled such that the sheet thickness becomes 0.25 [mm] or less as described above is sequentially passed to the surface treatment unit 25 from the tandem cold rolling mill 21 in the cold rolling surface treatment apparatus 2. The surface treatment unit 25 performs surface treatment for surface adjustment of the steel sheet 10, on the steel sheet 10 sent out from the tandem cold rolling mill 21 after the cold rolling. Thereby, the surface treatment unit 25 adjusts the surface roughness of the steel sheet 10 to an arithmetic mean roughness Ra of 0.40 [μm] or less, and adjusts the sheet thickness deviation in the sheet width direction D1 of the steel sheet 10 to 3 [μm] or less per 500 [mm].

This surface treatment for adjustment of the surface roughness and the sheet thickness deviation in the sheet width direction D1 of the steel sheet 10 by the surface treatment unit 25 in Step S101: may be light reduction of the surface of the steel sheet 10 with reducing rolls having a roll surface roughness at an arithmetic mean roughness Ra of 0.4 [μm] or less; may be physical grinding of the surface of the steel sheet 10 with a fine grained grinding means, such as a grinder or grinding rolls; or may be chemical polishing of the surface of the steel sheet 10 by dipping of the steel sheet 10 into an acidic medium.

Or, at the above described Step S101, the most downstream rolling mill 22 of the tandem cold rolling mill 21 (see FIG. 3) may perform surface treatment, in which: the steel sheet 10 is cold rolled to a sheet thickness in the above described range by the pair of rolling mill rolls 22a and 22b having a roll surface roughness at an arithmetic mean roughness Ra of 0.4 [μm] or less; and the surface roughness and the sheet thickness deviation in the sheet width direction D1 of the steel sheet 10 are adjusted to values in the above described ranges. In this case, at Step S101, the surface treatment on the steel sheet 10 by the surface treatment unit 25 may be not performed.

By the above described cold rolling surface treatment in Step S101, the steel sheet 10 serving as a material is processed into a thin steel sheet having a surface roughness at an arithmetic mean roughness Ra of 0.40 [μm] or less, a sheet thickness deviation in the sheet width direction D1, the sheet thickness deviation being 3 [μm] or less per 500 [mm], and a sheet thickness of 0.25 [mm] or less. The cold rolling surface treatment apparatus 2 manufactures such a thin steel sheet as the steel sheet 11, which is a material for laminated iron cores. The manufactured steel sheet 11 is, as illustrated in FIG. 3, wound into a coil shape, and thereafter sent to a subsequent process.

After executing Step S101, the laminated iron core manufacturing apparatus 1 performs final annealing of the steel sheet 11 serving as the material for laminated iron cores (Step S102). At Step S102, the annealing apparatus 3 of the laminated iron core manufacturing apparatus 1 receives the steel sheet 11 in the state of having been wound into the coil shape, from the cold rolling surface treatment apparatus 2 side, and continuously performs final annealing of the received steel sheet 11 while causing the steel sheet 11 to travel in the longitudinal direction D3 thereof. The steel sheet 11 after the final annealing by the annealing apparatus 3 is wound into a coil shape, and is thereafter sent to a subsequent process.

After executing Step S102, the laminated iron core manufacturing apparatus 1 receives plural steel sheets 11 that have been subjected to the above described final annealing, as the material for laminated iron cores, from the annealing apparatus 3 side, and sequentially performs processing of Steps S103 to S107 by using these plural steel sheets 11. Thereby, the laminated iron core manufacturing apparatus 1 manufacture the targeted laminated iron core 15. Hereinafter, by reference, as appropriate, to the three steel sheets 11a, 11b, and 11c illustrated in FIG. 4, as an example of the plural steel sheets 11 that are the material for laminated iron cores, the processing of Steps S103 to S107 will be described.

In a process subsequent to the above described Step S102, the punching apparatus 4 of the laminated iron core manufacturing apparatus 1 overlaps the plural steel sheets 11 that are the material for laminated iron cores with one another (Step S103). At Step S103, the pinch rolls 42 of the punching apparatus 4 overlap the plural steel sheets 11 having the surface roughness and sheet thickness deviation adjusted through the above described Step S101 with one another. Specifically, as illustrated in FIG. 4, the pinch rolls overlap, in the sheet thickness direction D2, the steel sheets 11a, 11b, and 11c, which have been received as the material for laminated iron cores and respectively put out from three steel sheet coils, while causing the steel sheets 11a, 11b, and 11c to travel in the sheet passing direction.

Each of plural steel sheets 11 (for example, the respective steel sheets 11a, 11b, and 11c) to be overlapped with one another in this Step S103 is a steel sheet, for which the sheet thickness, the surface roughness, and the sheet thickness deviation in the sheet width direction D1 have been adjusted by the above described cold rolling surface treatment in Step S101. That is, the sheet thickness of each of these steel sheets 11 is 0.25 [mm] or less, and the surface roughness of each of these steel sheets 11 is at an arithmetic mean roughness Ra of 0.40 [μm] or less. Further, the sheet thickness deviation in the sheet width direction D1 of at least a portion that is used as the laminated iron core 15 of each of these steel sheets 11 (the portion that is punched out into the iron core shape) is 3 [μm] or less per 500 [mm]. The surface roughness and the sheet thickness deviation in the sheet width direction D1 of each of these steel sheets 11 desirably satisfy the condition expressed by the above described Equation (1). That is, a value, which is added up of: a value resulting from multiplication of the sheet thickness deviation in the sheet width direction D1 of the steel sheet 11 by "0.05"; and the surface roughness of the same steel sheet 11, is desirably less than "0.5".

After executing Step S103, the punching apparatus 4 of the laminated iron core manufacturing apparatus 1 applies an oil based agent onto the plural steel sheets 11 that have been overlapped with one another through the above described Step S103 (Step S104). Specifically, at Step S104, the oil based agent application unit 43 of the punching apparatus 4 applies an oil based agent, such as a rolling oil, onto the steel sheets 11a, 11b, and 11c that have been overlapped with one another by the pinch rolls 42. Subsequently, the oil based agent application unit 43 causes the steel sheets 11a, 11b, and 11c after the application of the oil based agent to travel towards the pressing unit 44 while maintaining the steel sheets 11a, 11b, and 11c in the overlapped state.

After executing Step S104, the punching apparatus 4 of the laminated iron core manufacturing apparatus 1 performs pressing of the plural steel sheets 11 that have been applied with the oil based agent through the above described Step S104, and adheres these plural steel sheets 11 to one another (Step S105).

At Step S105, the pressing unit 44 of the punching apparatus 4 presses the plural steel sheets 11 that have been applied with the oil based agent, in their sheet thickness direction D2, in their overlapped state as described above, and removes air that is present between the overlapped surfaces of these plural steel sheets 11. Specifically, as illustrated in FIG. 4, the pressing unit 44 causes the steel sheets 11a, 11b, and 11c that have been applied with the oil based agent by the oil based agent application unit 43 to travel in the longitudinal direction D3 while maintaining their overlapped state, and presses the steel sheets 11a, 11b, and 11c in the sheet thickness direction D2 with the steel sheets 11a, 11b, and 11c interposed therein. Thereby, the pressing unit 44 removes air from between the overlapped surfaces of these steel sheets 11a, 11b, and 11c. By such pressing, the pressing unit 44 adheres the steel sheets 11a, 11b, and 11c to one another in the sheet thickness direction D2 and forms the adhered body 12. The pressing unit 44 sequentially sends the formed adhered body 12 of the steel sheets 11a, 11b, and 11c toward the pressing machine 45.

After executing Step S105, the punching apparatus 4 of the laminated iron core manufacturing apparatus 1 simultaneously punches the plural steel sheets 11 that have been overlapped with one another as described above, and obtains punched out bodies from these plural steel sheets 11 (Step S106).

At Step S106, the pressing machine 45 of the punching apparatus 4 simultaneously punches the plural steel sheets 11, from which the air has been removed from the overlapped surfaces therebetween through the above described Step S105, by driving of the die of press forming 46. Specifically, as illustrated in FIG. 4, the pressing machine 45 sandwiches and binds the adhered body 12 between the punch 46a and the die 46b of the die of press forming 46. Subsequently, the pressing machine 45 simultaneously punches the steel sheets 11a, 11b, and 11c forming this adhered body 12 into the targeted iron core shape by causing the punch 46a to rise and fall relatively to the die 46b. Thereby, the pressing machine 45 obtains iron core shaped punched out bodies, which have been punched out from these steel sheets 11a, 11b, and 11c.

After executing Step S106, the punching apparatus 4 of the laminated iron core manufacturing apparatus 1 forms the laminated iron core 15 by laminating and integrating together the plural punched out bodies obtained through the above described Step S106 (Step S107), and ends this processing.

Specifically, at Step S107, the pressing machine 45 of the punching apparatus 4 laminates and integrates together, inside the die of press forming 46, the plural punched out bodies obtained by the punching of the adhered body 12 of the steel sheets 11a, 11b, and 11c. When this is done, the pressing machine 45 integrates together the punched out bodies in the state of having been laminated onto one another, inside the die of press forming 46, by caulking, by using the fall of the punch 46a, after obtaining the plural punched out bodies from the adhered body 12, for example. As a result, the pressing machine 45 manufactures the laminated iron core 15 of the targeted shape (for example, the ring shape illustrated in FIG. 2).

At this Step S107, the integration of the iron core shaped punched out bodies may be realized by the pressing machine 45: forming dimples for caulking in the punched out bodies by use of the die of press forming 46; and pressing the dimples with a predetermined device and caulking the punched out bodies together. Further, the integration of the iron core shaped punched out bodies may be realized by: the punched out bodies being welded together outside the die of press forming 46, or the punched out bodies being fixed together by use of a fixing means, such as a bolt or an adhesive.

In the method of manufacturing a laminated iron core according to the embodiment of the present invention, the above described processing of Steps S101 to S107 is repeatedly executed every time the steel sheet 11 serving a material for laminated iron cores is manufactured, or every time the laminated iron core 15 is manufactured by use of the plural steel sheets 11.

First Example

Next, a first example of the present invention will be described. In the first example, after a slab, which contains, in steel, 0.002 [mass %] of carbon (C), 3.6 [mass %] of silicon (Si), 0.10 [mass %] of aluminum, 0.3 [mass %] of manganese (Mn), 0.0015 [mass %] of sulfur (S), and 0.002 [mass %] of nitrogen (N), was heated at a temperature of 1100 [° C.], the slab was hot rolled to a sheet thickness of 2.0 [mm], the obtained hot rolled steel sheet was annealed at a temperature of 950 [° C.], this hot rolled steel sheet after the annealing was pickled, and thereby the steel sheet 10 serving as a material was manufactured.

Further, in the first example, this steel sheet 10 was cold rolled by the tandem cold rolling mill 21 (see FIG. 3), such that the sheet thickness thereof became 0.20 [mm], and thereby the steel sheet 11 serving as a material was manufactured. In the cold rolling, the roughness of the roll surfaces of the rolling mill rolls 22a and 22b of the most downstream rolling mill 22 in the tandem cold rolling mill 21 was at an arithmetic mean roughness Ra of 0.2 [μm] or more and 0.40 [μm] or less. Thereafter, final annealing of this steel sheet 11 was performed at a temperature of 750 [° C.], and an electrical steel sheet, which is the steel sheet 11 serving as a material for laminated iron cores, was manufactured.

Five measuring positions at 100 [mm] intervals in the sheet width direction D1 were determined for the steel sheet 11 obtained as described above, and the surface roughness Ra of the steel sheet 11 was measured by use of a surface texture measuring instrument, SURFCOM 130A of ACCRETECH, with a measurement range of 50 [mm] in the sheet thickness direction D2 and a resolution of 0.001 [μm]. Further, the sheet thickness of the steel sheet 11 was measured at five points at 100 [mm] intervals in the sheet width direction D1 by use of a laser range finder, and based on results of this measurement, the sheet thickness deviation x of the steel sheet 11 per length of 500 [mm] in the sheet width direction D1 was found.

Further, in the first example, two of the steel sheets 11, for which the surface roughness Ra and the sheet thickness deviation x have been measured, were supplied to and overlapped with each other by the punching apparatus 4 (see FIG. 4), and after these overlapped two steel sheets 11 were pressed in the sheet thickness direction D2 by the pressing unit 44, the two steel sheets 11 were simultaneously punched in a ring shape having an outer diameter φa of 80 [mm] and an inner diameter φb of 60 [mm] by the pressing machine 45. As described above, samples satisfying requirements of the present invention (hereinafter, referred to as samples of present invention examples) were manufactured. Thereafter, in the first example, for each of the obtained samples of the present invention examples, the circularity, "a", which serves as a value for evaluating the iron core shape after the punching, was found. In this first example, the circularity, "a", is an average of measured values of respective circularities measured and obtained for ten punched out bodies (test pieces) obtained by the above described punching of the steel sheets 11.

As an example to be compared with the samples of the present invention examples in the first example, samples of comparative examples were manufactured. In the first example, a method of manufacturing the samples of the comparative examples was the same as that for the samples of the present invention examples, except that cold rolling was performed with the roughness of the roll surfaces of the rolling mill rolls 22a and 22b at an arithmetic mean roughness Ra exceeding 0.40 [μm] and being 0.60 [μm] or less. Further, in the first example, the surface roughness Ra, the sheet thickness deviation x, and the circularity, "a", of each of the samples of the comparative examples were measured and obtained by a method that is the same as that for the samples of the present invention examples described above.

Figure 6:
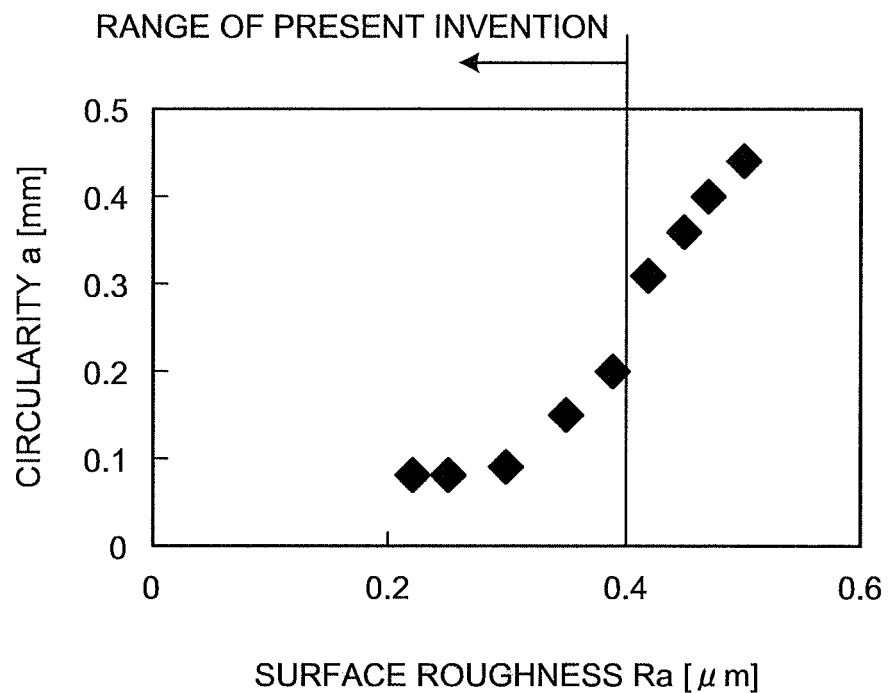
FIG. 6 is a diagram illustrating influence of surface roughness of an electrical steel sheet serving as a material for laminated iron cores, over circularity of an iron core shape after punching thereof.
Figure 7:
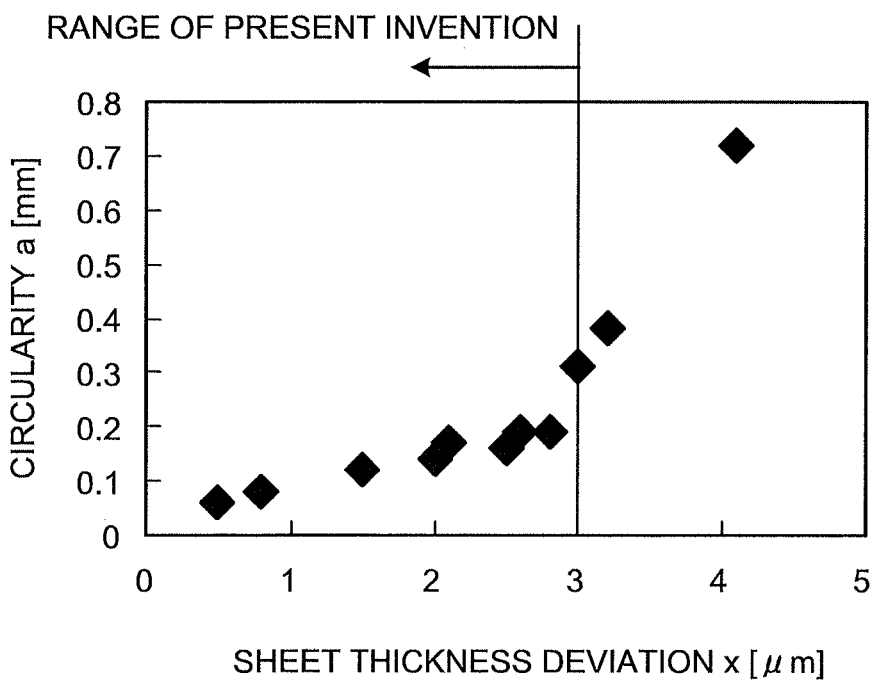
FIG. 7 is a diagram illustrating influence of sheet thickness deviation of an electrical steel sheet serving as a material for laminated iron cores, over circularity of an iron core shape after punching thereof.

In the first example, for the samples of the present invention examples, and the samples of the comparative examples, influence of the surface roughness Ra and the sheet thickness deviation x of the electrical steel sheet serving as the material for laminated iron cores over the circularity, "a", of the iron core shape after the punching, was evaluated. Results of that evaluation are listed in Table 1. In Table 1, samples #5 to #10, and #13 to #20 are the samples of the present invention examples. Samples #1 to #4, #11, and #12 are the samples of the comparative examples. Further, FIG. 6 is a diagram illustrating influence of the surface roughness of the electrical steel sheet serving as the material for laminated iron cores, over the circularity of the iron core shape after the punching. FIG. 7 is a diagram illustrating influence of the sheet thickness deviation of the electrical steel sheet serving as the material for laminated iron cores, over the circularity of the iron core shape after the punching.

TABLE 1

| Sample number | Surface roughness Ra [μm] | Sheet thickness deviation x [μm] | Circularity a [mm] | Notes |
| --- | --- | --- | --- | --- |
| Sample #1 | 0.5 | 2.6 | 0.44 | Comparative example |
| Sample #2 | 0.47 | 2.4 | 0.40 | Comparative example |
| Sample #3 | 0.45 | 2.4 | 0.36 | Comparative example |
| Sample #4 | 0.42 | 2.6 | 0.31 | Comparative example |
| Sample #5 | 0.39 | 2.4 | 0.23 | Present invention example |
| Sample #6 | 0.35 | 2.6 | 0.15 | Present invention example |
| Sample #7 | 0.3 | 2.6 | 0.09 | Present invention example |
| Sample #8 | 0.25 | 2.6 | 0.08 | Present invention example |
| Sample #9 | 0.22 | 2.6 | 0.08 | Present invention example |
| Sample #10 | 0.38 | 2.6 | 0.19 | Present invention example |
| Sample #11 | 0.36 | 4.1 | 0.72 | Comparative example |
| Sample #12 | 0.36 | 3.2 | 0.38 | Comparative example |
| Sample #13 | 0.36 | 2.9 | 0.28 | Present invention example |
| Sample #14 | 0.36 | 2.8 | 0.19 | Present invention example |
| Sample #15 | 0.35 | 2.5 | 0.16 | Present invention example |
| Sample #16 | 0.36 | 2.1 | 0.17 | Present invention example |
| Sample #17 | 0.35 | 2 | 0.14 | Present invention example |
| Sample #18 | 0.36 | 1.5 | 0.12 | Present invention example |
| Sample #19 | 0.36 | 0.8 | 0.08 | Present invention example |
| Sample #20 | 0.36 | 0.5 | 0.06 | Present invention example |

As understood by reference to Table 1, and FIG. 6 and FIG. 7, when the surface roughness Ra is 0.40 [μm] or less, and the sheet thickness deviation x is 3 [μm] or less per 500 [mm] in the sheet width direction D1, the circularity, "a", is reduced. Accordingly, it is understood that by appropriate adjustment of the surface roughness Ra and the sheet thickness deviation x of the steel sheet 11 serving as the material for laminated iron cores, the iron core shape after the punching is improved.

Second Example

Next, a second example of the present invention will be described. In the second example, after a slab, which contains, in steel, 0.002 [mass %] of carbon (C), 2.5 [mass %] of silicon (Si), 0.70 [mass %] of aluminum, 0.05 [mass %] of manganese (Mn), 0.0020 [mass %] of sulfur (S), and 0.002 [mass %] of nitrogen (N), was heated at a temperature of 1100 [° C.], the slab was hot rolled to a sheet thickness of 2.0 [mm], the obtained hot rolled steel sheet was annealed at a temperature of 950 [° C.], this hot rolled steel sheet after the annealing was pickled, and thereby the steel sheet 10 serving as a material was manufactured.

Further, in the second example, this steel sheet 10 was cold rolled by the tandem cold rolling mill 21 (see FIG. 3), such that the sheet thickness thereof became 0.20 [mm]. Subsequently, a process of the surface treatment unit 25 (hereinafter, referred to as a process A), in which the steel sheet 10 after the cold rolling was washed after being dipped in a nitric acid aqueous solution with a nitric acid concentration of 10 [%] for ten seconds, was performed, and thereby, the steel sheet 11 serving as a material was manufactured. Furthermore, in the second example, separately from the steel sheet 11 that has gone through this process A, a steel sheet 11 serving as a material was manufactured by execution of a process of the surface treatment unit 25 (hereinafter, referred to as a process B), in which light reduction of the steel sheet 10 after the above described cold rolling is performed with reducing rolls having a roll surface roughness at a arithmetic mean roughness Ra of 0.30 [μm]. Thereafter, final annealing of these steel sheets 11 was performed at a temperature of 750 [° C.], and electrical steel sheets, which are the steel sheets 11 serving as the material for laminated iron cores, were manufactured. For the steel sheets 11 of the second example obtained as described above, similarly to the above described first example, the surface roughness Ra and the sheet thickness deviation x were measured and obtained.

Subsequently, in the second example, two or three of the steel sheets 11, for which the surface roughness Ra and the sheet thickness deviation x have been measured, were supplied to and overlapped with one another by the punching apparatus 4 (see FIG. 4), and these overlapped two or three steel sheets 11 were pressed in the sheet thickness direction D2 by the pressing unit 44. Subsequently, the two or three steel sheets 11 that have been overlapped with one another and pressed were simultaneously punched by the pressing machine 45 into a ring shape having an external diameter φa of 80 [mm] and an inner diameter φb of 60 [mm]. As described above, samples of present invention examples in the second example were manufactured. Thereafter, similarly to the above described first example, the circularity "a" of each of the samples of the present invention examples in the second example was found.

As an example to be compared with the samples of the present invention examples in the second example, samples of comparative examples were manufactured. In a method of manufacturing the samples of the comparative examples in this second example, the above described process A or process B was replaced with a process (hereinafter, referred to as a process C), in which the steel sheet 10 after the cold rolling is not subjected to the surface treatment by the surface treatment unit 25, the cold rolled steel sheet 11 was directly used as the material for laminated iron cores, and the rest of the method was made the same as that for the samples of the present invention examples. Further, in the second example, the surface roughness Ra, the sheet thickness deviation x, and the circularity, "a", of each of the samples of the comparative examples were measured and obtained by a method that is the same as that for the samples of the present invention examples described above.

In the second example, for the samples of the present invention examples, and the samples of the comparative examples, influence of: the processes A, B, and C in the manufacture of the material for laminated iron cores; the number of electrical steel sheets simultaneously punched, the electrical steel sheets serving as the material for laminated iron cores; and the surface roughness Ra and the sheet thickness deviation x of the electrical steel sheet serving as the material for laminated iron cores, over the circularity, "a", of the iron core shape after the punching, was evaluated. Results of that evaluation are listed in Table 2. In Table 2, samples #21 to #24 are the samples of the present invention examples. Samples #25 and #26 are the samples of the comparative examples. Further, FIG. 8 is a diagram illustrating influence of the manufacturing processes of the electrical steel sheet serving as the material for laminated iron cores and of the number of simultaneously punched sheets, over circularity of the iron core shape after the punching.

TABLE 2

| Sample number | Process | Number of sheets punched simultaneously | Surface roughness Ra [μm] | Sheet thickness deviation x [μm] | Circularity a [mm] | Notes |
| --- | --- | --- | --- | --- | --- | --- |
| Sample #21 | A | 2 | 0.22 | 2.1 | 0.08 | Present invention example |
| Sample #22 | A | 3 | 0.22 | 2.1 | 0.10 | Present invention example |
| Sample #23 | B | 2 | 0.32 | 2.6 | 0.14 | Present invention example |
| Sample #24 | B | 3 | 0.32 | 2.6 | 0.17 | Present invention example |
| Sample #25 | C | 2 | 0.5 | 2.4 | 0.41 | Comparative example |
| Sample #26 | C | 3 | 0.5 | 2.4 | 0.49 | Comparative example |

Figure 8:
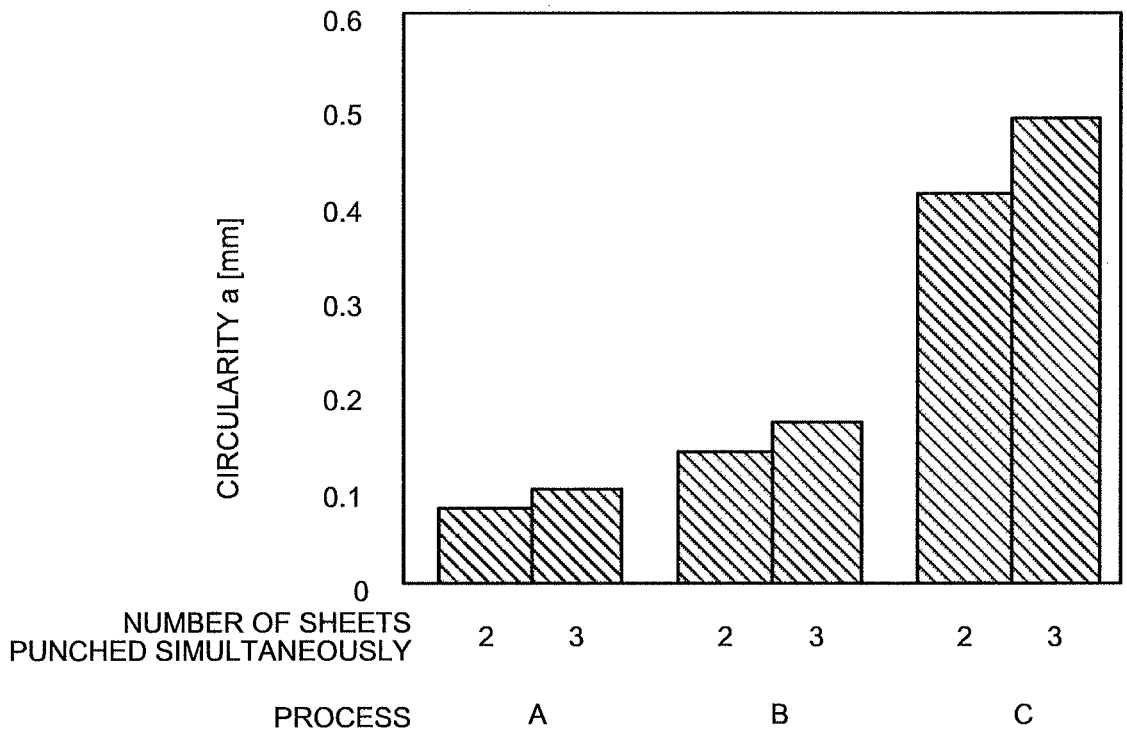
FIG. 8 is a diagram illustrating influence of manufacturing processes of an electrical steel sheet serving as a material for laminated iron cores and of the number of simultaneously punched out sheets, over circularity of an iron core shape after punching thereof.

As understood by reference to Table 2 and FIG. 8, by execution of the process A or process B, the surface roughness Ra of the steel sheet 11 is able to be adjusted to 0.40 [μm] or less, and the sheet thickness deviation x is able to be adjusted to 3 [μm] or less per 500 [mm] in the sheet width direction D1. By use of these steel sheets 11 as the material for laminated iron cores, in the case where the number of simultaneously punched sheets is two or three, as compared to the case of the steel sheets 11 that have gone through the process C, the circularity, "a", is reduced. Accordingly, it is understood that by execution of a process (for example, the process A or process B), by which the surface roughness Ra and the sheet thickness deviation x of the steel sheet 11 serving as the material for laminated iron cores are able to be appropriately adjusted to values in the ranges required by the present invention, regardless of the number of simultaneously punched steel sheets 11, the iron core shape after the punching is improved.

Third Example

Next, a third example of the present invention will be described. In the third example, after a slab, which contains, in steel, 0.002 [mass %] of carbon (C), 2.5 [mass %] of silicon (Si), 0.70 [mass %] of aluminum, 0.05 [mass %] of manganese (Mn), 0.0020 [mass %] of sulfur (S), and 0.002 [mass %] of nitrogen (N), was heated at a temperature of 1100 [° C.], the slab was hot rolled to a sheet thickness of 2.0 [mm], the obtained hot rolled steel sheet was annealed at a temperature of 950 [° C.], this hot rolled steel sheet after the annealing was pickled, and thereby a steel sheet 10 as serving as a material was manufactured.

Further, in the third example, this steel sheet 10 was cold rolled by the tandem cold rolling mill 21 (see FIG. 3), such that the sheet thickness thereof became 0.20 [mm], and thereby a steel sheet 11 serving as a material was manufactured. In the cold rolling, the roughness of the roll surfaces of the rolling mill rolls 22a and 22b of the most downstream rolling mill 22 in the tandem cold rolling mill 21 was at an arithmetic mean roughness Ra of 0.3 [μm]. Thereafter, final annealing of this steel sheet 11 was performed at a temperature of 750 [° C.], and an electrical steel sheet, which is the steel sheet 11 serving as a material for laminated iron cores, was manufactured. For the steel sheets 11 of the third example obtained as described above, similarly to the above described first example, the surface roughness Ra and the sheet thickness deviation x were measured and obtained.

Subsequently, in the third example, two of the steel sheets 11, for which the surface roughness Ra and the sheet thickness deviation x have been measured, were supplied to and overlapped with one another by the punching apparatus 4 (see FIG. 4), and a rolling oil was applied onto a surface of these overlapped two steel sheets 11. Upon the application, the percentage of the application area of the rolling oil with respect to the surface of the steel sheets 11 (hereinafter, referred to as a rolling oil application area percentage) was varied in a range of 0 to 100 [%] of the entire surface of the steel sheets 11. Subsequently, the two steel sheets 11 that have been applied with the rolling oil as described above were pressed and adhered together in the sheet thickness direction D2 by the pressing unit 44, and these adhered two steel sheets 11 were simultaneously punched by the pressing machine 45 into a ring shape having an outer diameter φa of 80 [mm] and an inner diameter φb of 60 [mm]. As described above, samples of present invention examples in the third example were manufactured. Thereafter, similarly to the above described first example, the circularity, "a", of each of the samples of the present invention examples in the third example was found.

In the third example, for the samples of the present invention examples, influence of the rolling oil application area percentage [%], and of the surface roughness Ra and the sheet thickness deviation x of the electrical steel sheet serving as the material for laminated iron cores, over the circularity, "a", of the iron core shape after the punching, was evaluated. Results of that evaluation are listed in Table 3. In Table 3, samples #31 to #36 are the samples of the present invention examples. Further, FIG. 9 is a diagram illustrating influence of rolling oil application area percentage of the electrical steel sheet serving as the material for laminated iron cores, over the circularity of the iron core shape after the punching.

TABLE 3

| Sample number | Rolling oil application area percentage [%] | Surface roughness Ra [μm] | Sheet thickness deviation x [μm] | Circularity a [mm] | Notes |
| --- | --- | --- | --- | --- | --- |
| Sample #31 | 0 | 0.3 | 2.8 | 0.18 | Present invention example |
| Sample #32 | 10 | 0.3 | 2.8 | 0.15 | Present invention example |
| Sample #33 | 20 | 0.3 | 2.8 | 0.13 | Present invention example |
| Sample #34 | 50 | 0.3 | 2.8 | 0.11 | Present invention example |
| Sample #35 | 70 | 0.3 | 2.8 | 0.11 | Present invention example |
| Sample #36 | 100 | 0.3 | 2.8 | 0.10 | Present invention example |

Figure 9:
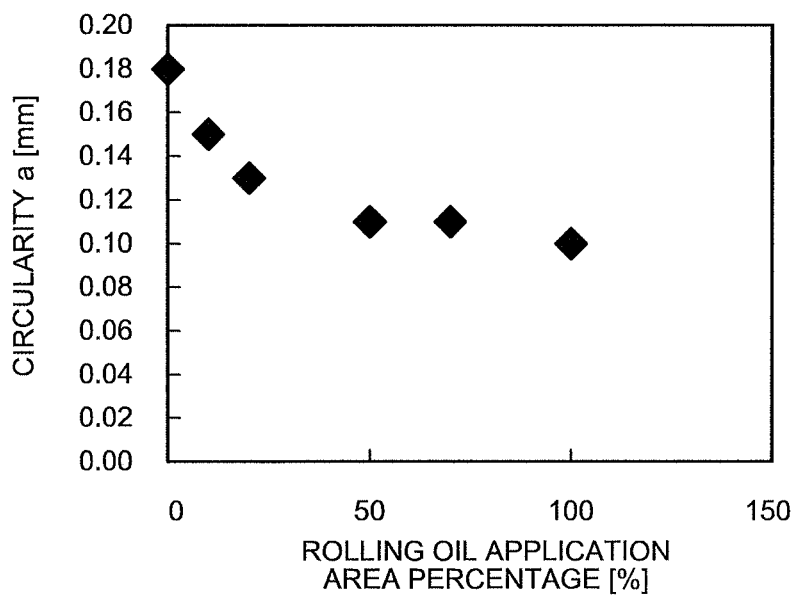
FIG. 9 is a diagram illustrating influence of rolling oil application area percentage on an electrical steel sheet serving as a material for laminated iron cores, over circularity of an iron core shape after punching thereof.

As understood by reference to Table 3 and FIG. 9, by application of a rolling oil onto the overlapped steel sheets 11 having the surface roughness Ra of 0.40 [μm] or less and the sheet thickness deviation x in the sheet width direction D1 of 3 [μm] or less per 500 [mm], the circularity, "a", is reduced. Accordingly, it is understood that by application of a rolling oil onto the steel sheets 11 overlapped with one another in the sheet thickness direction D2 after appropriate adjustment of the surface roughness Ra and the sheet thickness deviation x of the steel sheet 11 serving as the material for laminated iron cores to values in the ranges required by the present invention, the iron core shape after the punching is improved even more.

As described above, according to the embodiment of the present invention, a surface roughness of plural steel sheets forming a material for laminated iron cores, the plural steel sheets being overlapped with one another and punched when a laminated iron core is manufactured, is at a arithmetic mean roughness Ra of 0.40 [μm] or less, and a sheet thickness deviation in a sheet width direction of at least a portion to be used as the laminated iron core, the portion being of the steel sheets forming the material for laminated iron cores, is 3 [μm] or less per 500 [mm].

Therefore, when the plural steel sheets serving as the material for laminated iron cores are overlapped with one another in the sheet thickness direction, it becomes difficult for air to enter between the overlapped surfaces of these plural steel sheets. Accordingly, these overlapped plural steel sheets are able to be adhered together before punching, and the adhesion area between these overlapped steel sheets is able to be made as large as possible. Thereby, without any adhesive being interposed between the overlapped surfaces of the plural steel sheets serving as the material for laminated iron cores, sufficient adhesive strength between these overlapped plural steel sheets is able to be obtained. As a result, when the plural steel sheets overlapped as the material for laminated iron cores are simultaneously punched, floating and displacement of the steel sheets are able to be reduced, and thus a satisfactory punched out shape of the steel sheets corresponding to a targeted iron core shape is able to be obtained. Furthermore, since an adhesive is not required in the adhesion between these plural steel sheets, a laminated iron core with a high space factor is able to be realized.

According to the present invention, a steel sheet excellent for being punched into a targeted iron core shape is able to be realized as a material for laminated iron cores, and by use of such a steel sheet as a material for laminated iron cores, shape deviation from the targeted iron core shape in plural punched out bodies obtained by simultaneous punching of plural steel sheets overlapped with one another in a sheet thickness direction is able to be reduced. As a result, a laminated iron core with degradation of its magnetic property reduced as much as possible is able to be stably manufactured. Further, a high space factor is able to be obtained for a laminated iron core, and as a result, an excellent laminated iron core, with low energy loss, is able to be manufactured.

Further, according to the embodiment of the present invention, a value, which is added up of a value resulting from multiplication of a sheet thickness deviation of a steel sheet serving as a material for laminated iron cores by "0.05", and a surface roughness of the steel sheet, is less than "0.5". Therefore, the synergistic effect of the effect due to the reduction in surface roughness of the steel sheet and the effect due to the reduction in sheet thickness deviation, which have been described above, is able to be obtained. As a result, since entrance of air between the overlapped surfaces of the plural steel sheets is able to be reduced even further, the punched out shape of the steel sheets serving as the material for laminated iron cores is able to be improved further.

Further, according to the embodiment of the present invention, an oil based agent, such as a rolling oil, is applied onto plural steel sheets overlapped with one another in a sheet thickness direction thereof as a material for laminated iron cores. Thus, these overlapped plural steel sheets are able to be adhered together even more strongly by being pressed in the sheet thickness direction. Thereby, floating and displacement of the steel sheets upon punching are able to be reduced even further. As a result, the punched out shape of the steel sheets serving as the material for laminated iron cores is able to be improved even more.

In the above described embodiment, although a material for laminated iron cores and a method of manufacturing a laminated iron core, in a case where a ring shaped laminated iron core is manufactured, have been described, the present invention is not limited to this case. The material for laminated iron cores and the method of manufacturing a laminated iron core, according to the present invention may be for manufacturing a laminated iron core having a shape other than the ring shape, the shape being, for example, a rectangular shape. That is, the shape of a laminated iron core manufactured according to the present invention (the targeted iron core shape) is not particularly questioned. Further, usage of the laminated iron core manufactured is not limited to the use in a motor, and is not particularly questioned.

Further, in the above described embodiment, two or three steel sheets serving as the material for laminated iron cores were overlapped with one another and punched, but the present invention is not limited thereto. According to the present invention, the number of steel sheets to be overlapped with one another in the sheet thickness direction as the material for laminated iron cores just needs to be plural (two or more).

Further, in the above described embodiment, electrical steel sheets have been described as the material for laminated iron cores as an example, but the present invention is not limited thereto. The steel sheets serving as the material for laminated iron cores according to the present invention are not limited to electrical steel sheets, and may be steel sheets other than electrical steel sheets, or may be iron alloy sheets other than steel sheets.

Further, the present invention is not limited by the above described embodiment and examples, and those configured as appropriate by combination of the above described respective components are also included in the present invention. In addition, any other embodiments, examples, operation techniques, and the like made by those skilled in the art or the like based on the above described embodiment and examples are all included in the present invention.

As described above, a material for laminated iron cores, and a method of manufacturing a laminated iron core, according to the present invention are useful for manufacture of laminated iron cores, and in particular, are suitable as a material for laminated iron cores and a method of manufacturing a laminated iron core, which enable a satisfactory punched out shape to be obtained, and a laminated iron core with a high space factor to be realized.

REFERENCE SIGNS LIST

1 LAMINATED IRON CORE MANUFACTURING APPARATUS
2 COLD ROLLING SURFACE TREATMENT APPARATUS
3 ANNEALING APPARATUS
4 PUNCHING APPARATUS
10, 11, 11a, 11b, 11c STEEL SHEET
12 ADHERED BODY
15 LAMINATED IRON CORE
21 TANDEM COLD ROLLING MILL
22 MOST DOWNSTREAM ROLLING MILL
22a, 22b ROLLING MILL ROLL
25 SURFACE TREATMENT UNIT
42 PINCH ROLL
43 OIL BASED AGENT APPLICATION UNIT
44 PRESSING UNIT
45 PRESSING MACHINE
46 DIE OF PRESS FORMING
46a PUNCH
46b DIE
47 DIE HOLE
48 DIE PLATE
49 BLANK HOLDER
D1 SHEET WIDTH DIRECTION
D2 SHEET THICKNESS DIRECTION
D3 LONGITUDINAL DIRECTION

The invention claimed is:

1. A method of manufacturing a laminated iron core, the method comprising:
   a cold rolling surface treatment step of performing cold rolling and surface treatment on plural steel sheets for:
      adjusting a surface roughness of each of the plural steel sheets to be an arithmetic mean roughness Ra of 0.40 µm or less,
      adjusting a sheet thickness deviation in a sheet width direction of at least a portion used as the laminated iron core to be 3 µm or less per length of 500 mm in the sheet width direction, the portion being of each of the plural steel sheets, and
      adjusting a value, which is added up of a value resulting from multiplication of the sheet thickness deviation by 0.05, and the surface roughness, to be less than 0.5 µm;
   an overlapping step of overlapping the plural steel sheets with one another, each of the plural steel sheets having the surface roughness and the sheet thickness deviation that have been adjusted in the cold rolling surface treatment step;
   a punching step of simultaneously punching the overlapped plural steel sheets, and obtaining punched out bodies from the plural steel sheets, wherein the punched out bodies have a circularity in the range of 0.06 mm to 0.28 mm; and
   a laminating and integrating step of laminating and integrating together the punched out bodies and forming the laminated iron core.

2. The method of manufacturing the laminated iron core, according to claim 1, wherein the step of cold rolling surface treatment step of performing cold rolling and surface treatment on plural steel sheets further comprises adjusting a sheet thickness of the plural steel sheets to be 0.25 mm or less.

3. The method of manufacturing the laminated iron core, according to claim 1, the method further comprising:
   a pressing step of pressing the overlapped plural steel sheets in a sheet thickness direction thereof, and removing air that is present between overlapped surfaces of the plural steel sheets, wherein
   in the punching step, the plural steel sheets, in which the air has been removed from between the overlapped surfaces, are simultaneously punched.

4. The method of manufacturing the laminated iron core, according to claim 3, the method further comprising:
   an application step of applying an oil based agent on the overlapped plural steel sheets, wherein
   in the pressing step, the plural steel sheets that have been applied with the oil based agent are pressed in the sheet thickness direction.

* * * * *